US012020211B2

(12) United States Patent
Bidadi et al.

(10) Patent No.: US 12,020,211 B2
(45) Date of Patent: Jun. 25, 2024

(54) CONTEXT-INDEPENDENT CONVERSATIONAL FLOW

(71) Applicant: ADP, INC., Roseland, NJ (US)

(72) Inventors: Ashish Bidadi, New York, NY (US); Lohit Sarma, New York, NY (US); Christopher Fahey, New York, NY (US)

(73) Assignee: ADP, Inc., Roseland, NJ (US)

( * ) Notice: Subject to any disclaimer, the term of this patent is extended or adjusted under 35 U.S.C. 154(b) by 368 days.

(21) Appl. No.: 17/302,876

(22) Filed: May 14, 2021

(65) Prior Publication Data

US 2022/0366371 A1 Nov. 17, 2022

(51) Int. Cl.
| | |
|---|---|
| *G06Q 10/105* | (2023.01) |
| *G06F 9/451* | (2018.01) |
| *G06F 16/2457* | (2019.01) |
| *G06F 40/263* | (2020.01) |
| *G06N 20/20* | (2019.01) |

(52) U.S. Cl.
CPC ........... *G06Q 10/105* (2013.01); *G06F 9/451* (2018.02); *G06F 16/24575* (2019.01); *G06F 40/263* (2020.01); *G06N 20/20* (2019.01)

(58) Field of Classification Search
CPC . G06Q 10/105; G06F 9/451; G06F 16/24575; G06F 40/263; G06N 20/20
USPC ........................................................ 707/708
See application file for complete search history.

(56) References Cited

U.S. PATENT DOCUMENTS

| | | | |
|---|---|---|---|
| 2008/0140688 A1* | 6/2008 | Clayton | G06Q 10/0637 |
| 2013/0325976 A1* | 12/2013 | Mansfield | G06Q 50/01 |
| | | | 709/217 |
| 2016/0269330 A1* | 9/2016 | McEvoy | H04L 63/08 |
| 2019/0050480 A1* | 2/2019 | Courter | G06F 16/252 |
| 2020/0082828 A1* | 3/2020 | Malpani | G10L 15/26 |
| 2020/0134541 A1* | 4/2020 | Ebner | G06N 20/00 |
| 2020/0293167 A1* | 9/2020 | Blyumen | G06F 16/904 |

* cited by examiner

*Primary Examiner* — Hosain T Alam
*Assistant Examiner* — Saba Ahmed
(74) *Attorney, Agent, or Firm* — Foley & Lardner LLP (57) ABSTRACT

A method, apparatus, system, and computer program code for performing a human resource operation using a context-independent conversational flow. The computer system receives an intended human resource operation from an application executing on a user device, identifies the context-independent conversational flow for performing an intended human resource operation, and calls a structured data object according to the context-independent conversational flow. The computer system interprets the structured data object to produce a business rule output, and generates a context-independent response from the business rule output. The computer system transforms the context-independent response according to a user context to produce a context-specific response, and forwards the context-specific response to a user device for display within a conversational user interface of an application.

21 Claims, 9 Drawing Sheets

CONTEXT-INDEPENDENT CONVERSATIONAL FLOW

BACKGROUND

1. Field

The disclosure relates generally to an improved computer system and, more specifically, to a method, apparatus, computer system, and computer program product for performing a human resource operation using a context-independent conversational flow.

2. Description of the Related Art

Increasingly, businesses rely on business rule interpreters to conduct Internet-based business, or to generate browser-based software programs for others to use in the conduct of business. However, such programs can be complex and can be undesirably slow to compile and/or execute in real-time, especially on a web browser when communication with a remote computer is desirable or necessary. Thus, solutions for increasing the speed of operation of a computer to create and execute business rules are desirable.

SUMMARY

According to one embodiment of the present invention, a method provides for performing a human resource operation using a context-independent conversational flow. The method includes receiving an intended human resource operation from an application executing on a user device. The method includes identifying the context-independent conversational flow for performing an intended human resource operation. The method includes calling a structured data object according to the context-independent conversational flow, wherein the structured data object implements a set of business rules for performing the intended human resource operation. The method includes interpreting the structured data object to produce a business rule output. The method includes generating an context-independent response from the business rule output, wherein the context-independent response is generated according to the context-independent conversational flow. The method includes transforming the context-independent response according to a user context to produce a context-specific response, wherein the user context includes a context of the application and a context of the user device. The method includes forwarding the context-specific response to a user device for display within a conversational user interface of an application. According to another embodiment of the present invention, a computer system comprises a hardware processor and a human resources management system, in communication with the hardware processor, for performing a human resources operation using a context-independent conversational flow. The human resources management system is configured: to identify the context-independent conversational flow for performing an intended human resource operation; to call a structured data object according to the context-independent conversational flow, wherein the structured data object implements a set of business rules for performing the intended human resource operation; to interpret the structured data object to produce a business rule output; to generate an context-independent response from the business rule output, wherein the context-independent response is generated according to the context-independent conversational flow; to transform the context-independent response according to an application context to produce a context-specific response; and to forward the context-specific response to a user device for display within a conversational user interface of an application.

According to yet another embodiment of the present invention, a computer program product comprises a computer-readable storage media with program code stored on the computer-readable storage media for performing a human resource operation using a context-independent conversational flow. The program code is executable by a computer system: to identify the context-independent conversational flow for performing an intended human resource operation; to call a structured data object according to the context-independent conversational flow, wherein the structured data object implements a set of business rules for performing the intended human resource operation; to interpret the structured data object to produce a business rule output; to generate an context-independent response from the business rule output, wherein the context-independent response is generated according to the context-independent conversational flow; to transform the context-independent response according to an application context to produce a context-specific response; and to forward the context-specific response to a user device for display within a conversational user interface of an application.

DETAILED DESCRIPTION

The illustrative embodiments provide a computer system for performing a human resource operation using a context-independent conversational flow. The computer system receives an intended human resource operation from an application executing on a user device. The computer system identifies the context-independent conversational flow for performing an intended human resource operation. The computer system calls a structured data object according to the context-independent conversational flow. The structured data object implements a set of business rules for performing the intended human resource operation. The computer system interprets the structured data object to produce a business rule output. The computer system generates an context-independent response from the business rule output. The context-independent response is generated according to the context-independent conversational flow. The computer system transforms the context-independent response according to a user context to produce a context-specific response. The user context includes a context of the application and a context of the user device. The computer system forwards the context-specific response to a user device for display within a conversational user interface of an application.

Figure 1:
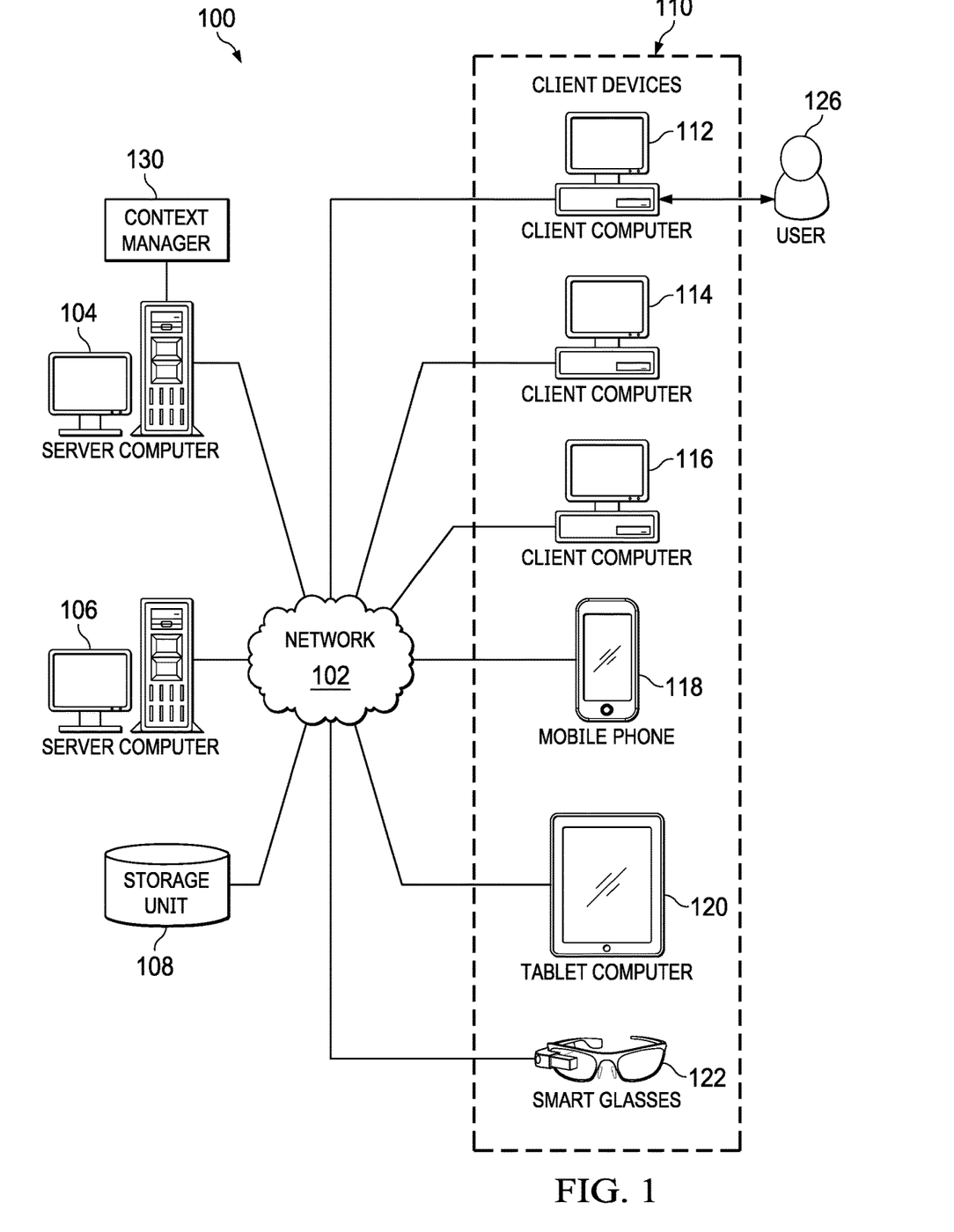
FIG. 1 is a pictorial representation of a network of data processing systems in which illustrative embodiments may be implemented.

With reference now to the figures and in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, user 126 operates client computer 112. In the illustrative example, context manager 130 can generate context specific chat messages in response to receiving user input from user 126 requesting assistance or help with performing a human resource operation.

In this illustrative example, context manager 130 can run on server computer 104. In another illustrative example, context manager 130 can be run in a remote location such as on client computer 114 and can take the form of a system instance of the application. In yet other illustrative examples, context manager 130 can be distributed in multiple locations within network data processing system 100. For example, context manager 130 can run on client computer 112 and on client computer 114 or on client computer 112 and server computer 104 depending on the particular implementation.

context manager 130 can operate to performing a human resource operation using a context-independent conversational flow. By transforming a context independent response generated according to the conversational flow, context manager 130 can provide context-specific responses for different user devices and collaboration tools conversational user interface flow. context manager 130 enables execution of a conversational user interface flow across multiple user devices, including but not limited to web, mobile, and text/sms. Context manager 130 enables execution of a single conversational user interface flow on multiple collaboration tools. context manager 130 can achieve these benefits without flow separate objects for the different user devices, collaboration tools, and combinations thereof.

According to an illustrative example, context manager 130 receives an intended human resource operation from an application executing on a user device. Context manager 130 identifies the context-independent conversational flow for performing an intended human resource operation. Context manager 130 calls a structured data object according to the context-independent conversational flow. The structured data object implements a set of business rules for performing the intended human resource operation. Context manager 130 interprets the structured data object to produce a business rule output. Context manager 130 generating an context-independent response from the business rule output. The context-independent response is generated according to the context-independent conversational flow. Context manager 130 transforms the context-independent response according to a user context to produce a context-specific response. The user context includes a context of the application and a context of the user device. Context manager 130 forwards the context-specific response to a user device for display within a conversational user interface of an application.

Figure 2:
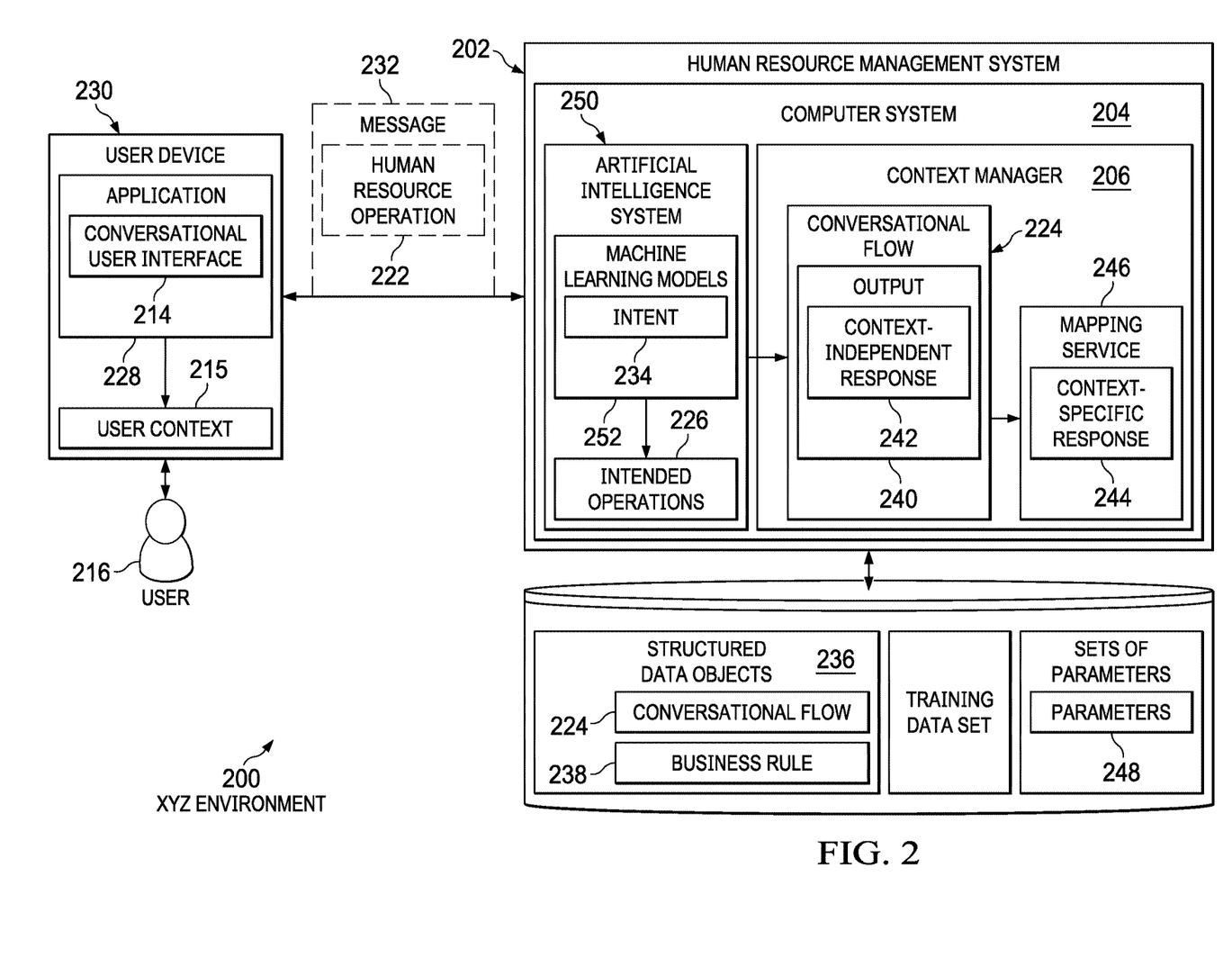
FIG. 2 is a block diagram of a human resources management environment depicted in accordance with an illustrative embodiment.

With reference now to FIG. 2, a block diagram of an human resources management environment is depicted in accordance with an illustrative embodiment. In this illustrative example, human resources management environment 200 includes components that can be implemented in hardware such as the hardware shown in network data processing system 100 in FIG. 1.

In this illustrative example, human resource management system 202 in human resources management environment 200 can provide a low code platform for the design and execution of a conversational user interface flow. Human resource management system 202 enables execution of the conversational user interface flow across multiple user devices, including but not limited to web, mobile, and text/sms. Additionally, human resource management system 202 enables execution of the conversational user interface flow on multiple collaboration tools.

As depicted, human resource management system 202 comprises computer system 204 and context manager 206. context manager 206 runs in computer system 204. context manager 206 can be implemented in software, hardware, firmware, or a combination thereof. When software is used, the operations performed by context manager 206 can be implemented in program code configured to run on hardware, such as a processor unit. When firmware is used, the operations performed by context manager 206 can be implemented in program code and data and stored in persistent memory to run on a processor unit. When hardware is employed, the hardware may include circuits that operate to perform the operations in context manager 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, application 228 runs on user device 230. User device 230 is an example of one of client devices 110 of FIG. 1. User 216 is a person that can interact with application 228 through conversational user interface 214 through user input generated by input system 212 for computer system 204. Input system 212 is a physical hardware system and can be selected from at least one of a mouse, a keyboard, a trackball, a touchscreen, a stylus, a motion sensing input device, a gesture detection device, a cyber glove, or some other suitable type of input device.

In this illustrative example, conversational user interface 214 is a graphical user interface that can enable user 216 to interact with one or more computers or other types of computing devices through a series of chat messages. For example, these computing devices can be client devices such as client devices 110 in FIG. 1.

In this illustrative example, context manager 206 in computer system 204 is configured to perform a human resource operation 222 using a context-independent conversational flow 224. context-independent conversational flow 224 is a structured data object that indicates the series of conversational chat messages for requesting and receiving information required for the identification and execution of human resources operation 222.

As used herein, "context-independent" refers to a context of the application and a context of the user device, collectively referred to as user context 215. For example, different collaboration applications may have different user interfaces, which can themselves be differently displayed on differing display devices of display system 210. Context-independent conversational flow 224 is "context-independent" in that it is agnostic to the user context 215, and can be implemented across a number of different applications and user devices.

Human resources operation 222 is an operation performed in support of one or more human resources functions of an organization. For example, human resources operation 222 can be selected from operations such as, but not limited to, at least one of hiring, benefits administration, payroll, performance reviews, forming teams for new products, assigning research projects, managing profile information or other suitable operations. Profile information managed by human resources operation 222 can include information such as, but not limited to, at least one of payroll, insurance, employee benefits, reviews, or other information employees of an organizations, such as user 216.

Context manager 206 receives an intended operation 226 from an application 228 executing on a user device 230. intended operation 226 can be indicated in a message 232 sent from application 228. Context manager 206 can determine the intended operation 226 based on the message 232, such as by determining an intent 234 of the message 232. Based on the determined intent 234, computer system 204 identifies the context-independent conversational flow 224 for performing an intended operation in intended operation 226.

computer system 204 calls one or more structured data objects 236 according to the context-independent conversational flow 224. Structured data objects 236 can implement a set of business rules 238 for performing the intended human resource operation.

Each of structured data objects 236 is a tree representation of the abstract syntactic structure of source code, independent of any particular representation or encoding. Each node of the tree denotes a construct occurring in the source code. As opposed to parse trees, typically built by a parser during a source code translation and compiling process, structured data objects 236 can be "abstract" in that it does not represent every detail appearing in the real syntax.

Each structured data object comprises a set of composable data nodes that are composed according to a domain-specific language to form the structured data object. For example, a set of data nodes can be manipulated to compose one or more business rule 238. Data nodes, and the underlying executor functions, can represent as little code as possible to allow different rules to be composed.

As used herein, a "business rule" is computer code executable only by a computer, to produce a change in a computer, a server computer, at a remote client computer, or at a local client computer based on input from a server computer. While the term "computer rule" could be substituted for "business rule," it is customary in the business world to refer to computer rules that are used to aid in electronic services used in support of the business as "business rules." Thus, the term "business rule" should not be interpreted as a human-implemented procedure in a business environment, but rather strictly as an information technology implementation of hardware or software, as defined above.

computer system 204 interprets the structured data object to produce a business rule output 240. When interpreted, business rule 238 provides a context for the composed data nodes of structured data objects 236, as well as a business rule metadata object entity for a single block inclusive of its children and returns the same context updated with the behavior of the executor itself.

computer system 204 generates an context-independent response 242 from the business rule output 240. The context-independent response 242 is generated according to the context-independent conversational flow 224. As stated above, "context-independent" refers to the user context 215, and does not refer to the execution context of business rule 238.

computer system 204 transforms the context-independent response 242 according to a user context 215 to produce a context-specific response 244. For example, a mapping service 246 defined with a service provider endpoint may intercept context-independent response 242. Mapping service 246 can reference a service map for locating different sets of parameters that are specific to user context 215. Utilizing mapping service 246, context manager 206 selects an parameters 248 relevant to user context 215, and transforms the context-independent response 242 according to parameters 248 matching the user context. In this manner, context manager 206 can transform context-independent response 242 to match a particular conversational user interface of the application as displayed on the user device.

Context manager 206 forwards the context-specific response 244 to a user device 230 for display within a conversational user interface 214 of an application 228. In one illustrative example, the context-specific response 244 is forwarded from mapping service 246 to the user device 230.

In some illustrative examples, context manager 206 can use artificial intelligence system 250. Artificial intelligence system 250 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

In this illustrative example, artificial intelligence system 250 can include a set of machine learning models 252. A machine learning model is a type of artificial intelligence model that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, and anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

In one illustrative embodiment, context manager 206 determines the intended operation 226 using an artificial intelligence system 250 in the computer system 204. Computer system 204 determines an intent 234 of the message 232 using a set of machine learning models 252. In this illustrative example, set of machine learning models 252 are trained from a data set that can include, for example, but not limited to, existing messages, existing business rules, existing conversational flows, and a dictionary of human capital management verbiage;

computer system 204 predicts a set of intended operations 226 based on the intent 234 determined by the artificial intelligence system 250. computer system 204 forwards the set of intended operations 226 to the user device 230 to be displayed within the conversational user interface 214 of the application 228.

In one illustrative example, computer system 204 predicts the set of intended operations 226 by computing a probability density function for each of the set of intended operations 226 predicted by the artificial intelligence system 250. Computer system 204 calculates a weighted average of the probability density functions. Computer system 204 can rank the set of intended operations 226 based on the weighted average to form a ranked order. computer system 204 displays the set of intended operations 226 in the conversational user interface 215 according to the ranked order.

The user can then confirm one of the intended operations 226 by selecting the operation from the displayed list. In one illustrative example, computer system 204 determines the intended human resource operation by receiving a selection from the application that is executing on the user device. computer system 204 identifies the context-independent conversational flow 224 based on the selection.

Computer system 204 can be configured to perform at least one of the steps, operations, or actions described in the different illustrative examples using software, hardware, firmware, or a combination thereof. As a result, computer system 204 operates as a special purpose computer system in context manager 206 in computer system 204. In particular, context manager 206 transforms computer system 204 into a special purpose computer system as compared to currently available general computer systems that do not have context manager 206. In this example, computer system 204 operates as a tool that can increase at least one of speed, accuracy, or usability of computer system 204. In one illustrative example, context manager 206 provides for increased accessibility and speed for developing and deploying conversational flows to manage human resource operations as compared with using current documentation systems.

The illustration of human resources management environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
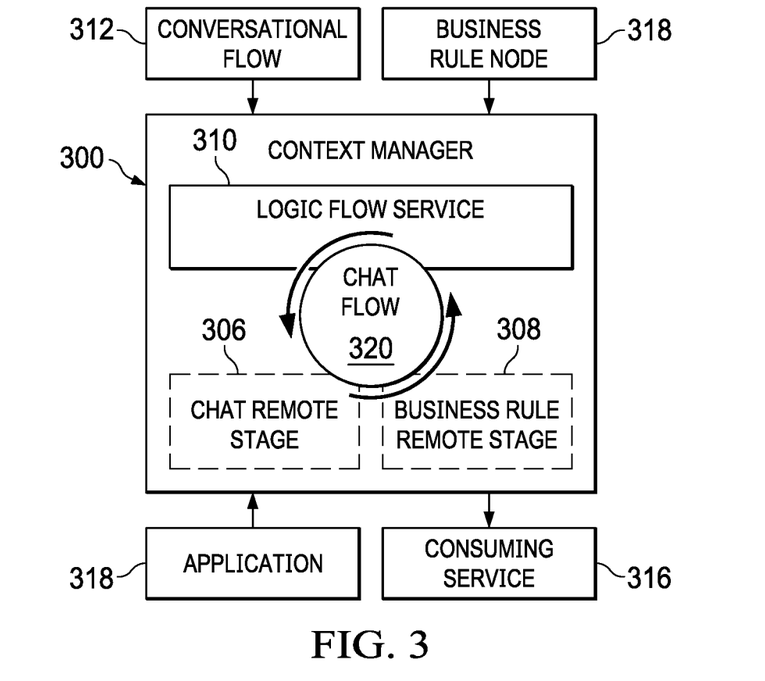
FIG. 3 is a block diagram of an architecture of a metadata-based human resources management system depicted in accordance with an illustrative embodiment.

FIG. 3 is a block diagram of an architecture of a metadata-based human resources management system depicted in accordance with an illustrative embodiment. Context manager 300 is an example of context manager 206, described in human resources management environment 200, and is presented as a network-based business system including both server computers and client computers.

Context manager 300 includes logic flow service 310. After an intended human resources operation has been identified, logic flow service 310 provides one or more context object identifications to chat remote stage 306 and business rule remote stage 308, which can be a server-side computer. The identifications are the identifications against which different structured data objects, such as structured data objects 236 of FIG. 2, can be resolved. Logic flow service 310 interprets the data nodes of the retrieved structured data objects, and generates chat output and business rule output therefrom.

Chat remote stage 306 allows communication between logic flow service 310 and application 318 executing on a user device. Chat remote stage 306 "exposes" some internal functions of application 318 to logic flow service 310 in a limited fashion. Chat remote stage 306 enables logic flow service 310 to share data with application 318.

Chat remote stage 306 receives interpreted metadata provided from logic flow service 310. Chat remote stage 306 generates chat output from the interpreted data objects of conversational flow 312. Chat output is the output provided by logic flow service 310 corresponding to the data objects and input values passed into chat remote stage 306. chat output to application 318 as chat messages.

Business rule remote stage 308 can be implemented as one or more data nodes within business rule 238 of FIG. 1. Business rule remote stage 308 is a program that allows communication between logic flow service 302 and consuming service 316. Business rule remote stage 308 "exposes" some internal functions of consuming service 316 to logic flow service 302 in a limited fashion. Business rule remote stage 308 enables logic flow service 302 to share data with consuming service 316.

Business rule remote stage 308 receives interpreted metadata provided from logic flow service 310. Business rule remote stage 308 generates business rule output from the interpreted metadata of business rule node 320. Business rule output is the output provided by logic flow service 310 corresponding to the data objects and input values passed into business rule remote stage 308. Business rule remote stage 308 sends business rule output to consuming service 316, enabling consuming service 316 to perform human resource operation 222 of FIG. 2.

Consuming service 316 represents a service for performing a human resource operation, such as human resource operation 222 of FIG. 2. Consuming service 316 can be a service that either requested that a business rule be executed, require output there from, or combinations thereof. In another illustrative example, consuming service 316 can be, but is not necessarily restricted to, a human resources application for performing a human resources operation, such as human resource operation 222 of FIG. 2. In one illustrative example, consuming service 316 can be implemented as a webpage.

Figure 4:
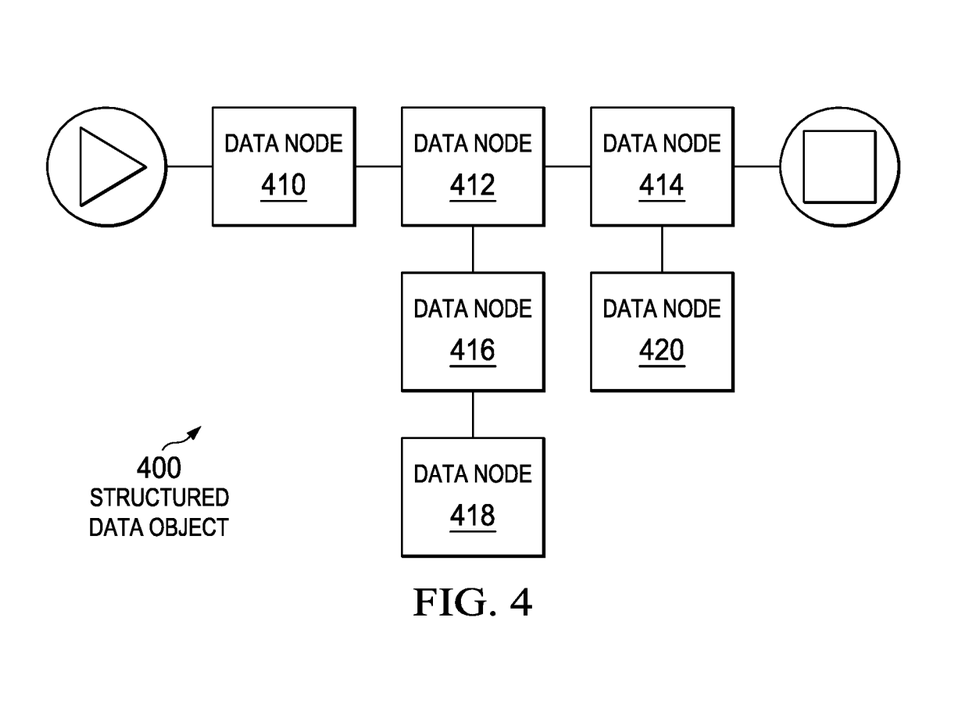
FIG. 4 is an illustration of a block diagram of a structured data object depicted in accordance with an illustrative embodiment.

With reference next to FIG. 4, an illustration of a block diagram of a structured data object is depicted in accordance with an illustrative embodiment. Structured data object 400 is an example of a composition of well-defined data nodes that can be linked together according to a domain-specific language to create mini-apps, collections, or bundles in a user-perceived codeless development environment.

Structured data object 400 includes data nodes 410, 412, and 414. Data nodes 410, 412, and 414 are well-defined structured data objects that can be manipulated to create desired business rules. Data nodes 410, 412, and 414 may be visually presented in a low-code application development environment, enabling the user to build different business rules, mini-apps and applications.

Each of data nodes 410, 412, and 414 correlates to one or more functions, which in turn can be interpreted by node interpreter 314 of FIG. 3 for implementing the corresponding business rule. The different permutations of the compositions of these functions, as well as differentiated input, enable the execution of the different business rule behaviors at runtime.

The functions of data nodes 410, 412, and 414 operate inside of a context defined at the beginning of the business rule execution step, which is the target object for all symbols defined in the course of the business rule execution, as well as for all input to and output from the business rule itself. In this manner, data nodes 410, 412, and 414 act as configuration objects to the code being executed, defining an execution context (or scope being executed against) to other joined data nodes.

For example, structured data object 400 further includes data node 416. Data node 416 provides additional context for execution of related data node 412. Specifically, data node 416 may indicate that data node 412, as well as child data nodes thereof, should be interpreted within the context of data node 416.

Structured data object 400 further includes data node 418. Data node 418 provides additional context for execution of both related data node 412 and data node 416. For example, data node 418 may indicate that information required for execution of data node 412 should be requested and received from one or more web services. Data node 418 requests and returns the same context updated with the information received through the web services.

Structured data object 400 further includes data node 420. Data node 420 provides additional context for execution of related data node 414. For example, data node 420 may indicate a consuming service for receipt of output provided by related data node 414. Data node 420 requests and returns information to a consuming service, such as a web page.

Figure 5:
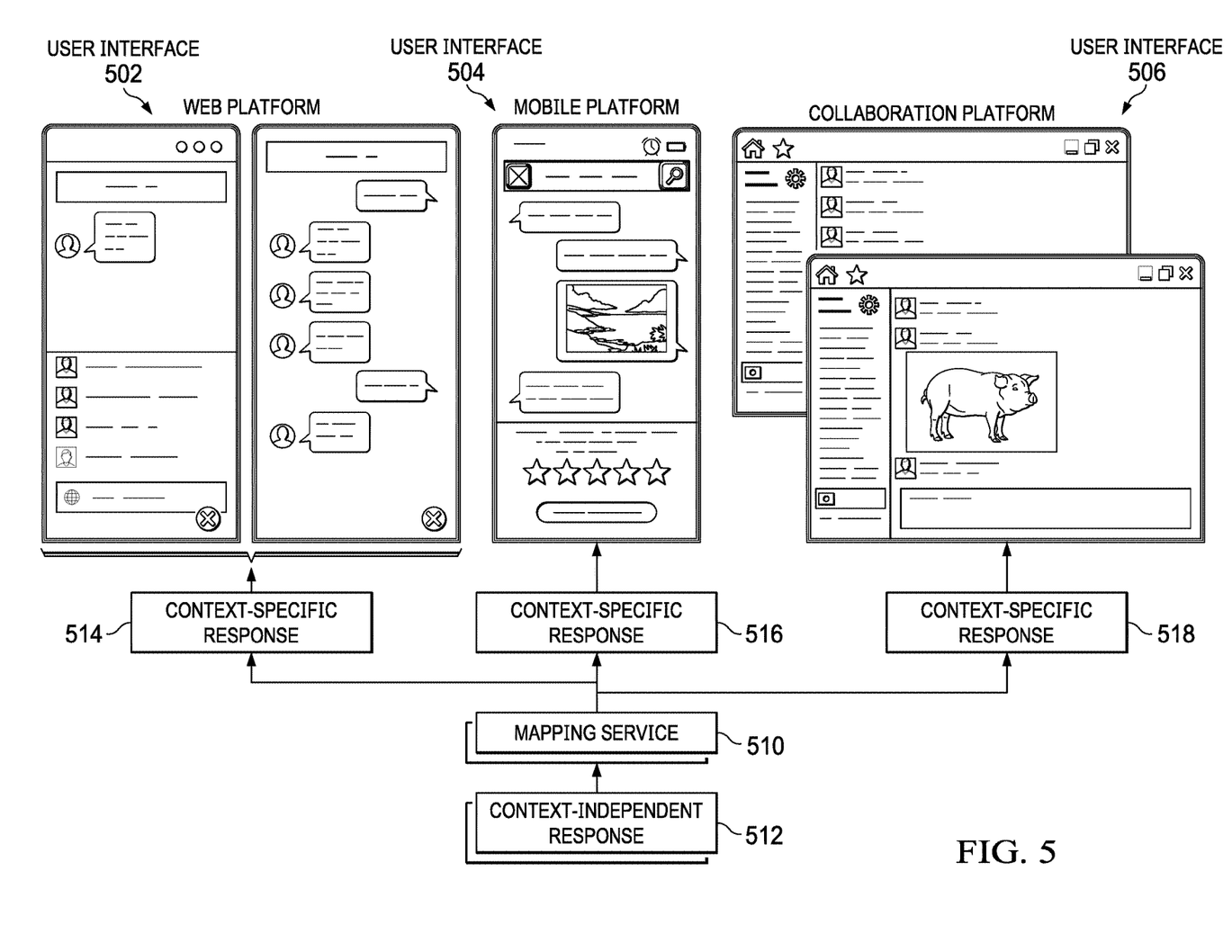
FIG. 5 is an illustration of a data flow for transforming the context-independent response for display on conversational user interfaces shown in accordance with an illustrative embodiment.

Turning now to FIG. 5, an illustration of a data flow for transforming the context-independent response for display on conversational user interfaces is shown in accordance with an illustrative embodiment. As depicted, user interfaces 502, 504, and 506 are examples of implementations for conversational user interfaces ABC in FIG. 2.

As depicted, mapping service 510 intercepts context-independent response 512. Mapping service 510 transforms context-independent response 512 according to associated parameters for a particular collaboration platform to which the chat message will be delivered. For example, mapping service 510 may use a first set of parameters to generate context specific response 514 for delivery to user interface 502. mapping service 510 may use a different set of parameters to generate context specific response 516 for delivery to user interface 504. Furthermore, mapping service 510 may use yet another set of parameters to generate context specific response 518 for delivery to user interface 506.

Figure 6:
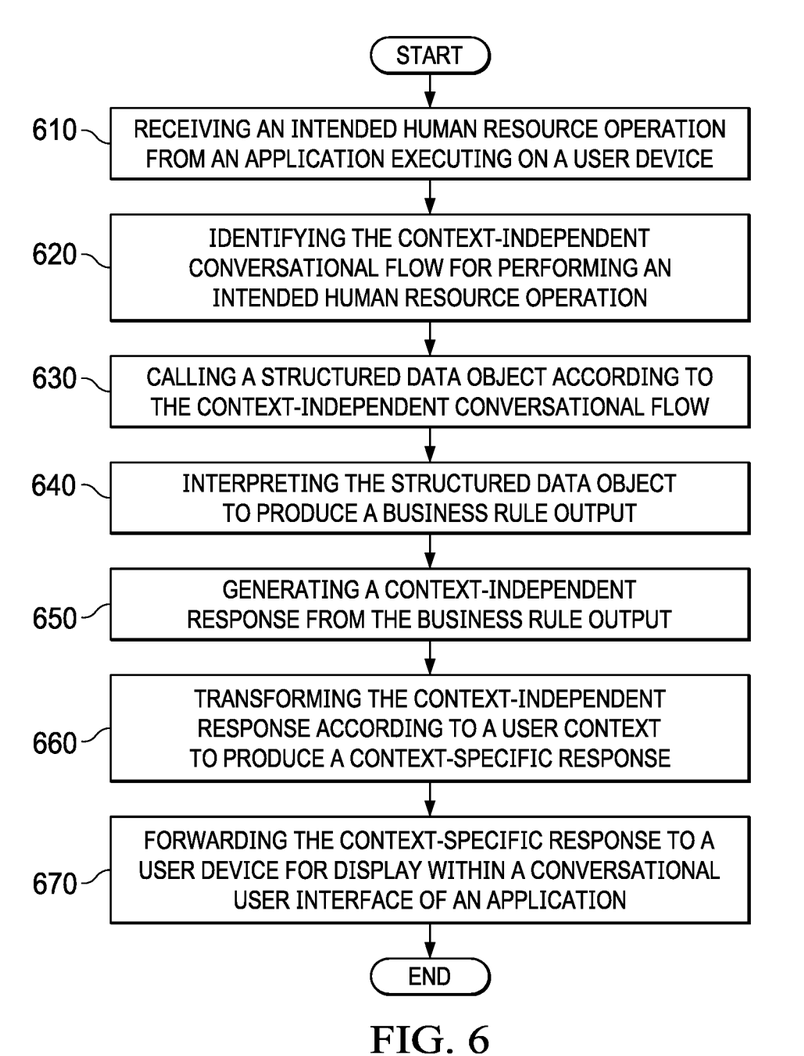
FIG. 6 is a flowchart of a process for performing a human resource operation using a context-independent conversational flow depicted in accordance with an illustrative embodiment.

Turning next to FIG. 6, a flowchart of a process for performing a human resource operation using a context-independent conversational flow is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process of FIG. 6 can be implemented in context manager 206 in computer system 204 in FIG. 2.

The process begins by receiving an intended human resource operation from an application executing on a user device (step 610). The application can be a collaboration platform having a conversational interface, such as application 318 of FIG. 2.

The process identifies the context-independent conversational flow for performing an intended human resource operation (step 620). The process calls a structured data object according to the context-independent conversational flow (step 630). The structured data object implements a set of business rules for performing the intended human resource operation. In one illustrative example, the structured data object comprises a set of composable data nodes that are composed according to a domain-specific language to form the structured data object.

The process interprets the structured data object to produce a business rule output (step 640). The process generates a context-independent response from the business rule output (step 650). The context-independent response is generated according to the context-independent conversational flow.

The process transforms the context-independent response according to a user context to produce a context-specific response (step 660). The user context includes a context of the application and a context of the user device. The process forwards the context-specific response to a user device for display within a conversational user interface of an application (step 670), and terminates thereafter.

Figure 7:
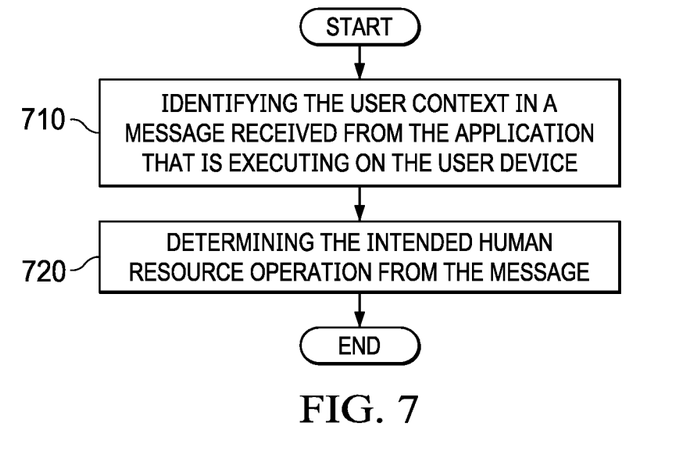
FIG. 7 is a flowchart of a process for receiving an intended human resource operation depicted in accordance with an illustrative embodiment.

Turning next to FIG. 7, a flowchart of a process for receiving an intended human resource operation is depicted in accordance with an illustrative embodiment. The process in FIG. 7 is an example one implementation for step 610 in FIG. 6.

The process identifies the user context in a message received from the application that is executing on the user device (step 710). The process determines the intended human resource operation from the message (step 720). Thereafter, the process continues to step 620 of FIG. 6.

Figure 8:
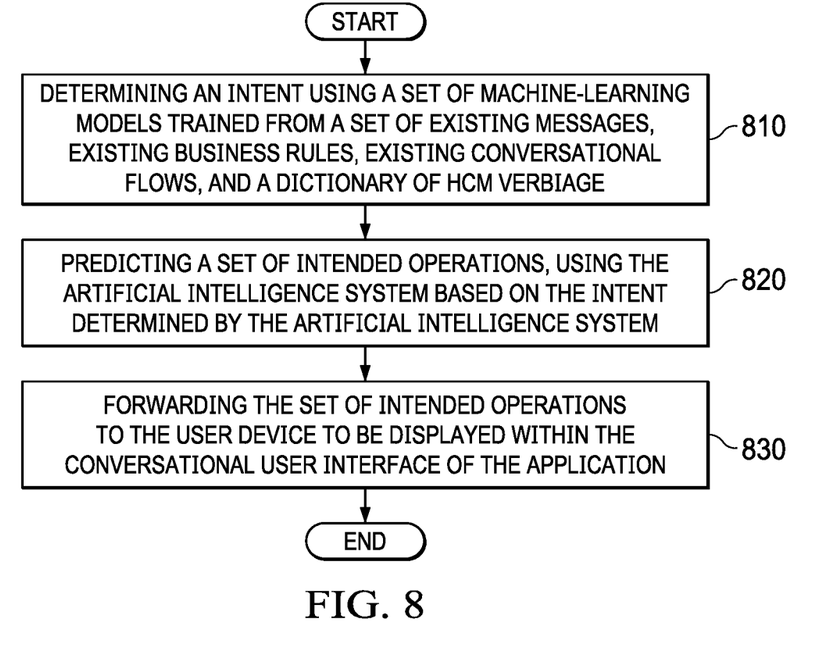
FIG. 8 is a flowchart of a process for determining an intended human resource operation depicted in accordance with an illustrative embodiment.

With reference next to FIG. 8, a flowchart of a process for determining an intended human resource operation is depicted in accordance with an illustrative embodiment. The process in FIG. 8 is an example one implementation for step 720 in FIG. 7.

The process determines an intent using a set of machine-learning models of an artificial intelligence system (step 810). The machine learning models are trained from a set of existing messages, existing business rules, existing conversational flows, and a dictionary of HCM verbiage.

Based on the intent determined by the artificial intelligence system, the process predicts predicting a set of intended operations (step 820). The process forwards the set of intended operations to the user device to be displayed within the conversational user interface of the application (step 830). The intended operation can identified based on a user-selection of one of the set of operations. Thereafter, the process continues to step 620 of FIG. 6.

Figure 9:
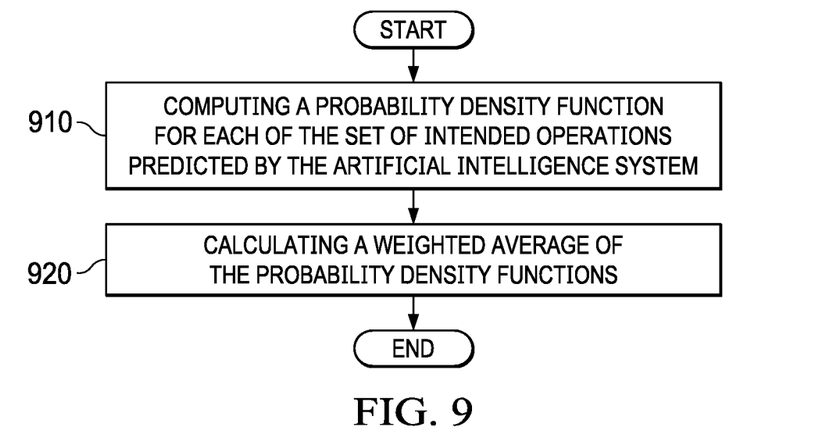
FIG. 9 is a flowchart of a process for predicting a set of intended operations depicted in accordance with an illustrative embodiment.

With reference next to FIG. 9, a flowchart of a process for predicting a set of intended operations is depicted in accordance with an illustrative embodiment. The process in FIG. 9 is an example one implementation for step 820 in FIG. 8.

The process computes a probability density function for each of the set of intended operations predicted by the artificial intelligence system (step 910). The process calculates a weighted average of the probability density functions (step 920). Thereafter, the process continues to step 830 of FIG. 8.

Figure 10:
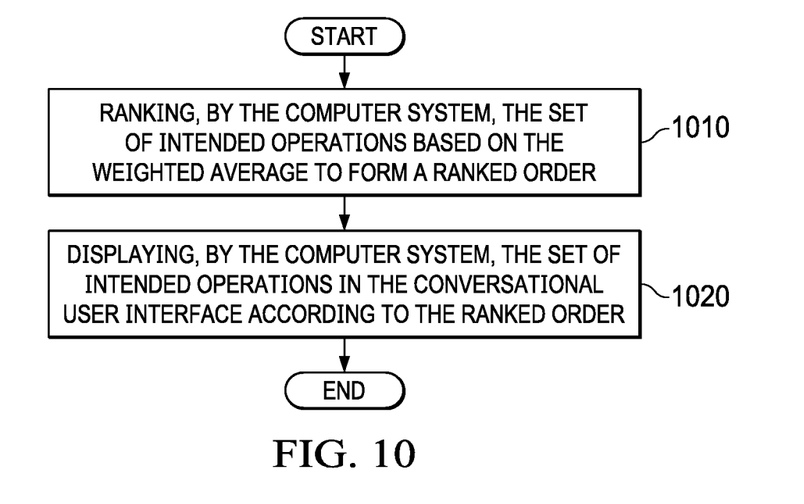
FIG. 10 is a flowchart of a process for displaying a set of intended operations depicted in accordance with an illustrative embodiment.

With reference next to FIG. 10, a flowchart of a process for displaying a set of intended operations is depicted in accordance with an illustrative embodiment. The process in FIG. 10 can be implemented in conjunction with process of FIG. 9, and is an example one implementation for step 830 in FIG. 8.

The process ranks the set of intended operations based on the weighted average to form a ranked order (step 1010). The process displays the set of intended operations in the conversational user interface according to the ranked order (step 1020). Thereafter, the process continues to step 620 of FIG. 6.

Figure 11:
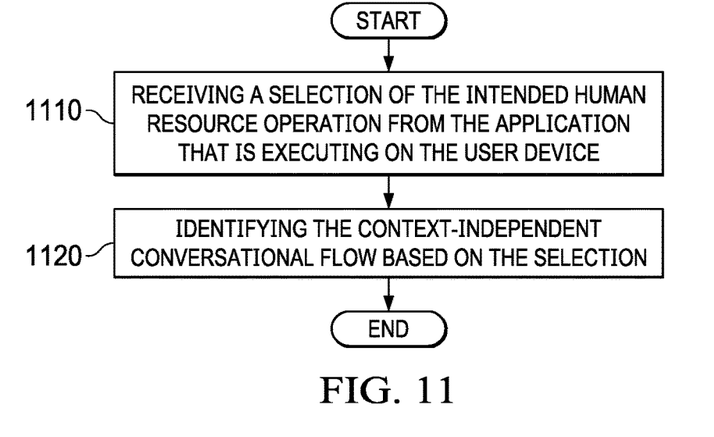
FIG. 11 is a flowchart of a process for determining an intended human resource operation depicted in accordance with an illustrative embodiment.

With reference next to FIG. 11, a flowchart of a process for determining an intended human resource operation is depicted in accordance with an illustrative embodiment. The process in FIG. 11 can be implemented in conjunction with process of FIG. 8, and is an example one implementation for step 610 in FIG. 6.

Continuing from step 830 of FIG. 8, the process receives a selection of the intended human resource operation from the application that is executing on the user device (step 1110). The process identifies the context-independent conversational flow based on the selection (step 1120). Thereafter, the process continues to step 620 of FIG. 6.

Figure 12:
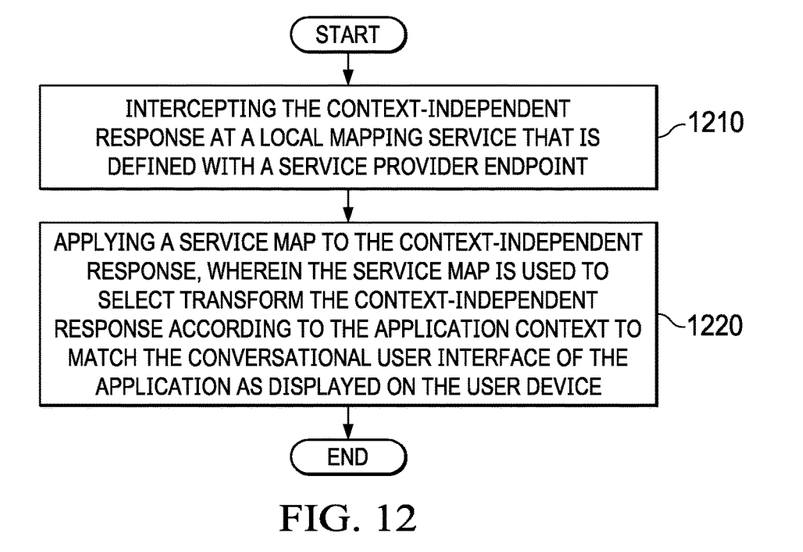
FIG. 12 is a flowchart of a process for transforming a context-independent response depicted in accordance with an illustrative embodiment.

With reference next to FIG. 12, a flowchart of a process for transforming a context-independent response is depicted in accordance with an illustrative embodiment. The process in FIG. 12 is an example one implementation for step 660 in FIG. 6.

The process intercepts the context-independent response at a local mapping service that is defined with a service provider endpoint (step 1210). The process applies a service map to the context-independent response (step 1220). The service map is used to select transform the context-independent response according to the application context to match the conversational user interface of the application as displayed on the user device. The process continues to step 670 of FIG. 6 thereafter.

Figure 13:
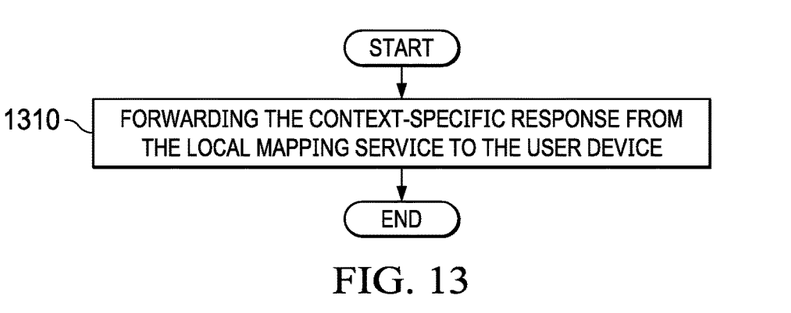
FIG. 13 is a flowchart of a process for forwarding the context-specific response to the user device depicted in accordance with an illustrative embodiment.

With reference next to FIG. 13, a flowchart of a process for forwarding the context-specific response to the user device is depicted in accordance with an illustrative embodiment. The process in FIG. 13 can be implemented in conjunction with the process of FIG. 12, and is an example one implementation for step 670 in FIG. 6.

Continuing from step 1220 of FIG. 12, the process forwards the context-specific response from the local mapping service to the user device (step 1310). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 14:
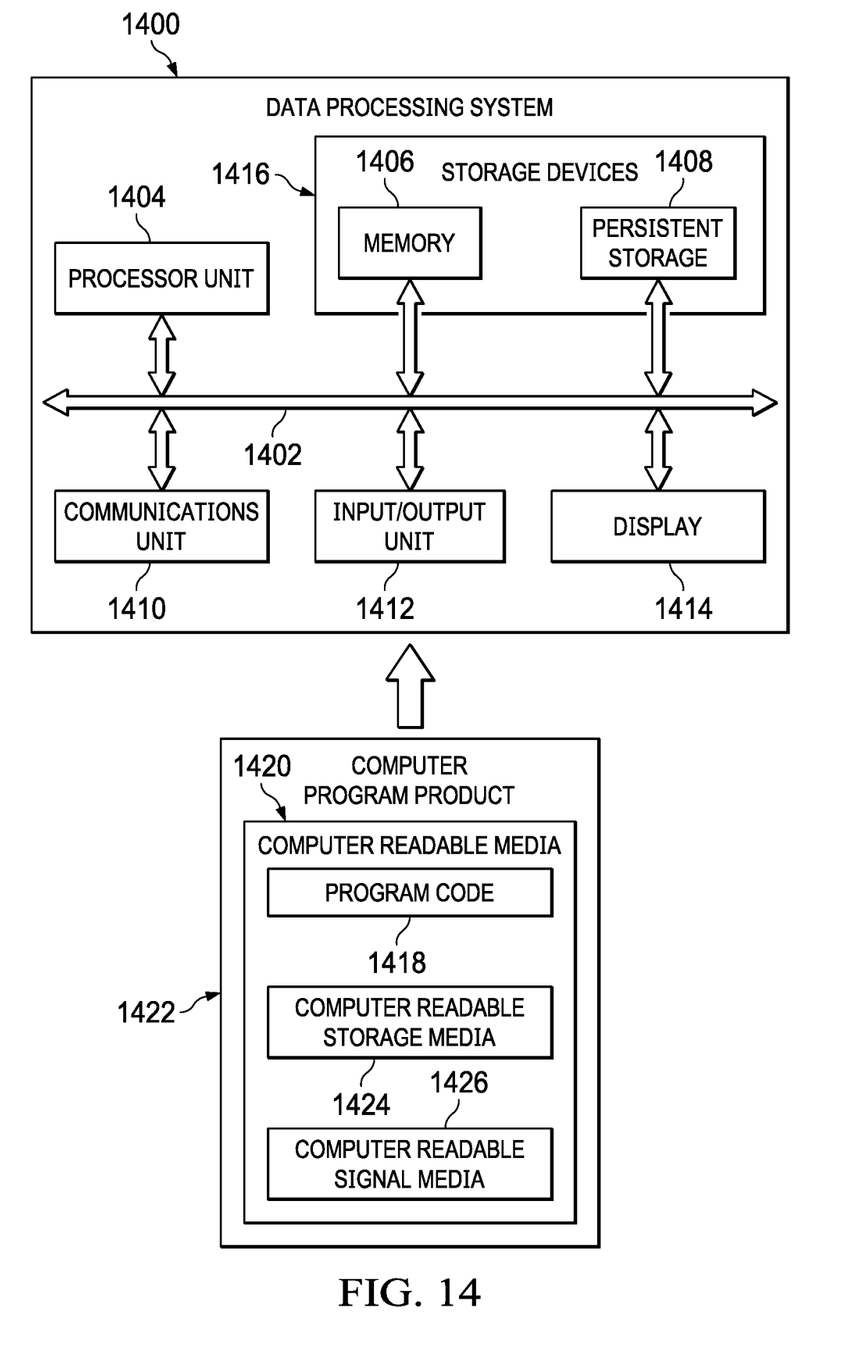
FIG. 14, a block diagram of a data processing system is depicted in accordance with an illustrative embodiment.

Turning now to FIG. 14, a block diagram of a data processing system is depicted in accordance with an illustrative embodiment. Data processing system 1400 can be used to implement server computer 104, server computer 106, client devices 110, in FIG. 1. Data processing system 1400 can also be used to implement computer system 204 in FIG. 2. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1404 can may be implemented using one or more heterogeneous processor systems in which a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are program instructions and are also referred are referred to as program code, computer usable program code, or computer-readable program code that can be read and executed by a processor in processor unit 1404. The program code in the different embodiments can be embodied on different physical or computer-readable storage media, such as memory 1406 or persistent storage 1408.

Program code 1418 is located in a functional form on computer-readable media 1420 that is selectively removable and can be loaded onto or transferred to data processing system 1400 for execution by processor unit 1404. Program code 1418 and computer-readable media 1420 form computer program product 1422 in these illustrative examples. In the illustrative example, computer-readable media 1420 is computer-readable storage media 1424.

In these illustrative examples, computer-readable storage media 1424 is a physical or tangible storage device used to store program code 1418 rather than a medium that propagates or transmits program code 1418. Computer-readable storage media 1424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible", as used herein, is a limitation of the medium itself (i.e., tangible, not a signal) as opposed to a limitation on data storage persistency (e.g., RAM vs. ROM).

Alternatively, program code 1418 can be transferred to data processing system 1400 using a computer-readable signal media. The computer-readable signal media are signals and can be, for example, a propagated data signal containing program code 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 1418 can be located in computer-readable media 1420 in the form of a single storage device or system. In another example, program code 1418 can be located in computer-readable media 1420 that is distributed in multiple data processing systems. In other words, some instructions in program code 1418 can be located in one data processing system while other instructions in program code 1418 can be located in one data processing system. For example, a portion of program code 1418 can be located in computer-readable media 1420 in a server computer while another portion of program code 1418 can be located in computer-readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program code 1418.

Thus, the illustrative embodiments of the present invention provide a computer-implemented method, computer system, and computer program product for performing a human resource operation using a context-independent conversational flow. In one illustrative example, a computer system receives an intended human resource operation from an application executing on a user device. The computer system identifies the context-independent conversational flow for performing an intended human resource operation. The computer system calls a structured data object according to the context-independent conversational flow. The structured data object implements a set of business rules for performing the intended human resource operation. The computer system interprets the structured data object to produce a business rule output. The computer system generates an context-independent response from the business rule output. The context-independent response is generated according to the context-independent conversational flow. The computer system transforms the context-independent response according to a user context to produce a context-specific response. The user context includes a context of the application and a context of the user device. The computer system forwards the context-specific response to a user device for display within a conversational user interface of an application.

The illustrative examples can be used to performing a human resource operation using a context-independent conversational flow. By transforming a context independent response generated according to the conversational flow, the illustrative embodiments can provide context-specific responses for different user devices and collaboration tools conversational user interface flow. context manager 130 enables execution of a conversational user interface flow across multiple user devices, including but not limited to web, mobile, and text/sms. Additionally, the illustrative embodiments execution of a single conversational user interface flow on multiple collaboration tools. The illustrative embodiments can achieve these benefits without flow separate objects for the different user devices, collaboration tools, and combinations thereof.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for performing a human resource operation using a context-independent conversational flow, the method comprising:
   determining, by a computer system comprising a processor coupled with memory, a set of human resource operations using a machine learning model trained on historical data comprising conversational flows, human capital management verbiage, and business rules;
   computing, by the computer system, a probability density function for each of the set of human resource operations;
   determining, by the computer system, a ranked order for the set of human resource operations using the probability density function for each of the set of human resource operations;

transmitting, by the computer system to a user device via a network, the set of human resource operations according to the ranked order for presentation on an application executing on the user device;
receiving, by the computer system via the application executing on the user device, a selection of an intended human resource operation from the presented set of human resource operations;
identifying, by the computer system, a context-independent conversational flow for performing the selection of the intended human resource operation received from the user device;
calling, by the computer system, a structured data object according to the context-independent conversational flow, wherein the structured data object implements a set of business rules for performing the intended human resource operation;
interpreting, by the computer system, the structured data object in accordance with the context-independent conversational flow to produce a business rule output comprising a context for the structured data object;
generating, by the computer system, a context-independent response from the business rule output wherein the context-independent response is generated according to the context-independent conversational flow;
transforming, by the computer system, the context-independent response according to a service map based on the application and the user device to produce a context-specific response for a conversational user interface of the application; and
forwarding, by the computer system, the context-specific response to the user device for display within the conversational user interface of the application.

2. The method of claim 1, further comprising:
identifying, by the computer system, a user context in a message received from the application that is executing on the user device; and
determining, by the computer system, the intended human resource operation from the message.

3. The method of claim 1, wherein determining the ranked order for the set of human resource operations comprises:
calculating, by the computer system, a weighted average of the probability density function for each of the set of human resource operations.

4. The method of claim 3, wherein presenting the set of human resource operations comprises:
ranking, by the computer system, the set of human resource operations based on the weighted average to form the ranked order; and
displaying, by the computer system, the set of human resource operations in the conversational user interface according to the ranked order.

5. The method of claim 1, wherein the structured data object comprises a set of composable data nodes that are composed according to a domain-specific language to form the structured data object.

6. The method of claim 1, wherein transforming the context-independent response further comprises:
intercepting, by the computer system, the context-independent response at a local mapping service that is defined with a service provider endpoint; and
applying, by the computer system, the service map to the context-independent response, wherein the service map is used to transform the context-independent response according to an application context to match the conversational user interface of the application as displayed on the user device.

7. The method of claim 6, wherein forwarding the context-specific response to the user device further comprises:
forwarding, by the computer system, the context-specific response from the local mapping service to the user device.

8. A computer system comprising:
a hardware processor; and
a human resource management system, in communication with the hardware processor, for performing a human resource operation using a context-independent conversational flow, wherein the human resource management system is configured:
to determine a set of human resource operations using a machine learning model trained on historical data comprising conversational flows, human capital management verbiage, and business rules;
to computer a probability density function for each of the set of human resource operations;
to determine a ranked order for the set of human resource operations using the probability density function for each of the set of human resource operations;
to transmit, to a user device via a network, the set of human resource operations according to the ranked order for presentation on an application executing on the user device;
to receive, via the application executing on the user device, a selection of an intended human resource operation from the presented set of human resource operations;
to identify a context-independent conversational flow for performing the selection of the intended human resource operation received from the user device;
to call a structured data object according to the context-independent conversational flow, wherein the structured data object implements a set of business rules for performing the intended human resource operation;
to interpret the structured data object in accordance with the context-independent conversational flow to produce a business rule output comprising a context for the structured data object;
to generate a context-independent response from the business rule output, wherein the context-independent response is generated according to the context-independent conversational flow;
to transform the context-independent response according to service map based on the application and the user device to produce a context-specific response for a conversational user interface of the application; and
to forward the context-specific response to the user device for display within the conversational user interface of the application.

9. The computer system of claim 8, wherein the human resource management system is further configured:
to identify an application context in a message received from the application that is executing on the user device; and
to determine the intended human resource operation from the message.

10. The computer system of claim 8, wherein in determining the ranked order for the set of human resource operations, the human resource management system is further configured:

to calculate a weighted average of the probability density function for each of the set of human resource operations.

11. The computer system of claim 10, wherein in presenting the set of human resource operations, the human resource management system is further configured:
   to rank the set of human resource operations based on the weighted average to form the ranked order; and
   to display the set of human resource operations in the conversational user interface according to the ranked order.

12. The computer system of claim 8, wherein the structured data object comprises a set of composable data nodes that are composed according to a domain-specific language to form the structured data object.

13. The computer system of claim 8, wherein in transforming the context-independent response, the human resource management system is further configured:
   to intercept the context-independent response at a local mapping service that is defined with a service provider endpoint; and
   to apply the service map to the context-independent response, wherein the service map is used to transform the context-independent response according to an application context to match the conversational user interface of the application as displayed on the user device.

14. The computer system of claim 13, wherein in forwarding the context-specific response to the user device, the human resource management system is further configured:
   to forward the context-specific response from the local mapping service to the user device.

15. A computer program product comprising:
   a non-transitory computer readable storage media; and
   program code, stored on the non-transitory computer readable storage media, for performing a human resource operation using a context-independent conversational flow, the program code comprising:
      program code for determining a set of human resource operations using a machine learning model trained on historical data comprising conversational flows, human capital management verbiage, and business rules;
      program code for computing a probability density function for each of the set of human resource operations;
      program code for determining a ranked order for the set of human resource operations using the probability density function for each of the set of human resource operations;
      program code for transmitting, to a user device via a network, the set of human resource operations according to the ranked order for presentation on an application executing on the user device;
      program code for receiving, via the application executing on the user device, a selection of an intended human resource operation from the presented set of human resource operations;
      program code for identifying a context-independent conversational flow for performing the selection of the intended human resource operation received from the user device;
      program code for calling a structured data object according to the context-independent conversational flow, wherein the structured data object implements a set of business rules for performing the intended human resource operation;
      program code for interpreting the structured data object in accordance with the context-independent conversational flow to produce a business rule output comprising a context for the structured data object;
      program code for generating a context-independent response from the business rule output, wherein the context-independent response is generated according to the context-independent conversational flow;
      program code for transforming the context-independent response according to a service map based on the application and the user device to produce a context-specific response for a conversational user interface of the application; and
      program code for forwarding the context-specific response to the user device for display within the conversational user interface of the application.

16. The computer program product of claim 15, further comprising:
   program code for identifying, by a computer system, an application context in a message received from the application that is executing on the user device; and
   program code for determining, by the computer system, the intended human resource operation from the message.

17. The computer program product of claim 16, wherein the program code for determining the ranked order for the set of human resource operations comprises:
   program code for calculating a weighted average of the probability density function for each of the set of human resource operations.

18. The computer program product of claim 17, wherein the program code for presenting the set of human resource operations comprises:
   program code for ranking, by the computer system, the set of human resource operations based on the weighted average to form the ranked order; and
   program code for displaying, by the computer system, the set of human resource operations in the conversational user interface according to the ranked order.

19. The computer program product of claim 15, wherein the structured data object comprises a set of composable data nodes that are composed according to a domain-specific language to form the structured data object.

20. The computer program product of claim 15, wherein the program code for transforming the context-independent response further comprises:
   program code for intercepting the context-independent response at a local mapping service that is defined with a service provider endpoint; and
   program code for applying the service map to the context-independent response, wherein the service map is used to transform the context-independent response according to an application context to match the conversational user interface of the application as displayed on the user device.

21. The computer program product of claim 20, wherein the program code for forwarding the context-specific response to the user device further comprises:
   program code for forwarding the context-specific response from the local mapping service to the user device.

* * * * *